United States Patent
Afaneh

(10) Patent No.: US 8,319,539 B2
(45) Date of Patent: Nov. 27, 2012

(54) IN-RUSH/OUT-RUSH CURRENT LIMITING CIRCUIT AND DEVICES CONTAINING SAME

(75) Inventor: Husein Afaneh, North York (CA)

(73) Assignee: ATI Technologies ULC, Markham, Ontario (CA)

( * ) Notice: Subject to any disclaimer, the term of this patent is extended or adjusted under 35 U.S.C. 154(b) by 180 days.

(21) Appl. No.: 12/833,631

(22) Filed: Jul. 9, 2010

(65) Prior Publication Data

US 2011/0032018 A1 Feb. 10, 2011

Related U.S. Application Data

(60) Provisional application No. 61/224,248, filed on Jul. 9, 2009.

(51) Int. Cl.
*H03K 5/08* (2006.01)

(52) U.S. Cl. ........ 327/318; 327/322; 361/93.9; 323/908

(58) Field of Classification Search .................. 327/318, 327/322; 361/93.9; 323/908
See application file for complete search history.

(56) References Cited

U.S. PATENT DOCUMENTS

| | | | | |
|---|---|---|---|---|
| 5,930,130 A | * | 7/1999 | Katyl et al. | 363/53 |
| 6,804,102 B2 | * | 10/2004 | Hamon et al. | 361/93.3 |
| 7,561,397 B2 | * | 7/2009 | Liang et al. | 361/93.9 |

OTHER PUBLICATIONS

Power MOSFET 20V/-20 V, 4.6 A/-4.1 A, uCool Complementary, 2×2 mm, WDFN Package; Semiconductor Components Industries, LLC; Rev. 3; Jun. 2009.
Maxim Single 1.2A USB Switch in 3mm×3mm TDFN; Maxim Integrated Products; Rev. 1; Jan. 2009.
Maxim Single USB Switch with Autoreset and Fault Blanking in Tiny TDFN; Maxim Integrated Products; Rev. 2; Mar. 2007.

* cited by examiner

*Primary Examiner* — Kenneth B. Wells
(74) *Attorney, Agent, or Firm* — Faegre Baker Daniels LLP

(57) ABSTRACT

An in-rush or out-rush current limiting circuit employs a low number of components to effect in-rush current limiting and may be employed in dongles or on-chip (in the case of serving as an out-rush current limiting circuit). The in-rush current limiting circuit may be employed, for example, in USB dongles, Display Port (DP) dongles, or any other suitable connector as desired. Alternatively, the circuit may be integrated onto a circuit board or within an integrated circuit as desired. Among other advantages, a lower cost, low complexity solution may be provided. In addition, bulk capacitance can be increased such as by employing a trickle resistor or other suitable limiting structure.

6 Claims, 5 Drawing Sheets

IN-RUSH/OUT-RUSH CURRENT LIMITING CIRCUIT AND DEVICES CONTAINING SAME

CROSS-REFERENCE TO RELATED APPLICATION

This application claims priority to the provisional patent application having Application No. 61/224,248, filed Jul. 9, 2009, having inventor Husein Afaneh and owned by instant assignee, for IN-RUSH/OUT RUSH CURRENT LIMITING CIRCUIT AND DEVICES CONTAINING SAME.

BACKGROUND OF THE DISCLOSURE

The disclosure relates generally to current limiting in-rush current limiting circuits, methods and devices containing the same.

Dongles or connectors, as known in the art may include active circuits and typically obtain their power from an external source such as the device, card, or other connection point to which the dongle is connected. Dongles (e.g., USB sticks) may provide differing functions including, for example, television tuning capabilities, so that a laptop device or other portable device may become a TV tuning device when the dongle is plugged into the device. Other functions are known to those of ordinary skill in the art.

A problem can arise however with connecting such dongles to a source device if too much in-rush current occurs and damages circuitry on the source device to which the dongle is connected.

Some in-rush current limiting circuits are known and in one example require external control signals to be provided by the circuit board or source device and may also require an inordinate number of components thereby unnecessarily increasing the cost and complexity of the dongle and/or in-rush current limiting circuit.

BRIEF DESCRIPTION OF THE DRAWINGS

The invention will be more readily understood in view of the following description when accompanied by the below figures and wherein like reference numerals represent like elements, wherein.

DETAILED DESCRIPTION OF THE PREFERRED EMBODIMENTS

Briefly, an in-rush or out-rush current limiting circuit employs a low number of components to effect in-rush current limiting and may be employed in dongles or on-chip (in the case of serving as an out-rush current limiting circuit). The in-rush current limiting circuit may be employed, for example, in USB dongles, Display Port (DP) dongles, or any other suitable connector as desired. Alternatively, the circuit may be integrated onto a circuit board or within an integrated circuit as desired. The outrush current limiting may be employed to limit current sourced by a device to a dongle for example. Among other advantages, a lower cost, low complexity solution may be provided. In addition, bulk capacitance can be increased such as by employing a trickle resistor or other suitable limiting structure.

The dongles are portable devices with suitable connectors to connect with a source device. In one example, a dongle may be a display dongle that connects to a VGA display provider that outputs VGA information, for example, such as a graphics processor board, or any other suitable source device. The dongle may also include another connector to connect, for example, to a display port type monitor through a different connector so that the display provider can output to a display monitor having a different information format.

Figure 1:
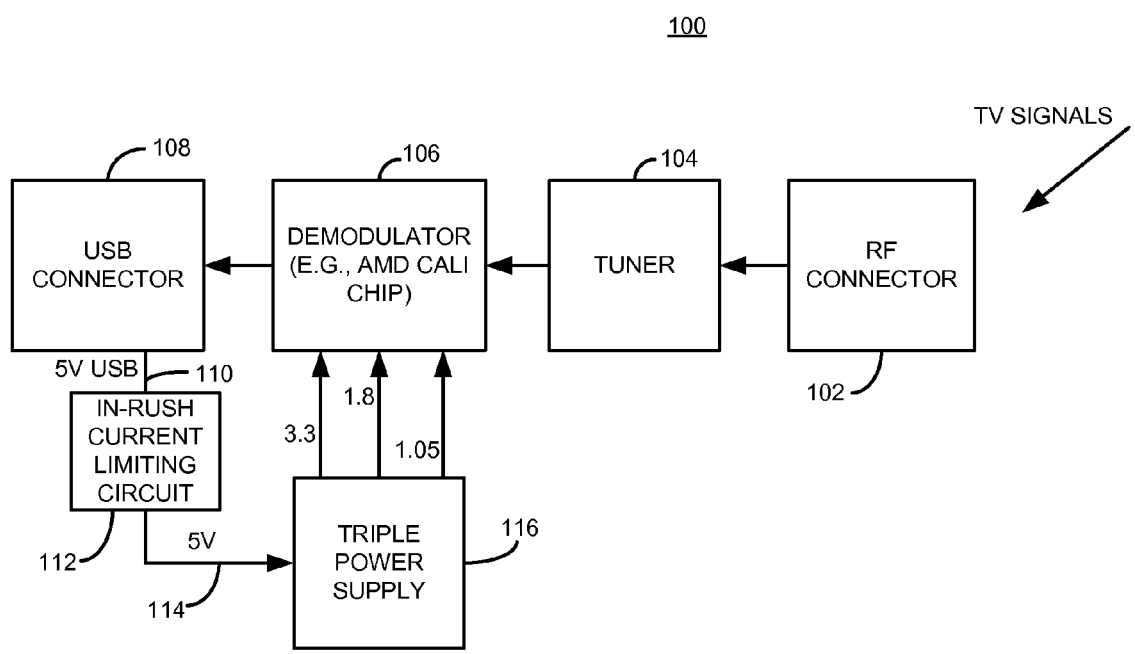
FIG. 1 is a block diagram illustrating one example of a device employing an in-rush current limiting circuit as employed in a USB connector or dongle.

FIG. 1 illustrates a block diagram of a USB stick (e.g., dongle) 100 that provides the function of a TV tuner or other RF tuner. As shown, within the USB stick is an RF connector 102 such as an antenna that receives wireless TV signals. The received signals are provided to a tuner 104 which tunes to the desired frequency. The output of the tuner is provided to a demodulator 106 which demodulates the signal which is then output to a USB connector 108. The USB connector 108 plugs into a laptop or other suitable source device from which the USB connector 108 obtains a 5 volt supply signal 110. An in-rush current limiting circuit 112 receives the 5 volt signal 114 and provides the 5 volt signal to an on-stick power supply 116 which may provide, in this example, three different voltage levels that may be used for the demodulator 106 or other on-dongle circuitry.

Figure 2:
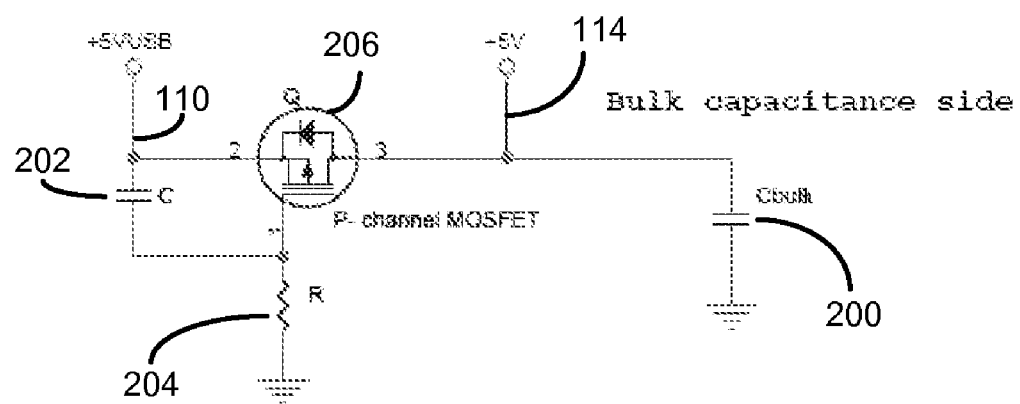
FIG. 2 is one example of an in-rush current limiting circuit in accordance with one example in the disclosure.

FIG. 2 illustrates one example of the in-rush current limiting circuit 112 in accordance with one embodiment. As illustrated in FIG. 2, the bulk capacitance 200 may be, for example, 10 micro farads or more and by way of example, the capacitor 202 (C) may be 220 nano farads and the resistor 204 (R) may be 10 kilo ohms. However, it will be recognized that any suitable values may be employed depending upon the particular application. As shown, the in-rush current limiting circuit 112 includes a PMOS transistor 206 that has a gate, source and drain. The source is coupled to receive the supply voltage 110 from an external voltage supply source. The drain provides an internal supply voltage 114 based on the external supply voltage 110. The capacitor 202 has a first node coupled to the source and a second node coupled to the resistor 204 and gate of the PMOS transistor 206. The resistor has a node coupled to the PMOS gate and the node to receive a ground potential. When the in-rush current limiting circuit is employed in a dongle such as a USB dongle, when the dongle is plugged into the source device, the 5 volt supply 110 is provided by the source device and the in-rush current limiting circuit limits the in-rush current to the internal circuitry of the dongle. A trickle resistor is shown in this embodiment to assist in the precharge operation of the bulk capacitor. In this example, the in-rush current limiting circuit 112 includes a trickle resistor placed across the source and drain of the PMOS transistor and is coupled between the external supply voltage and the internal supply voltage.

Referring to FIG. 2, at the instant in which the USB device with this circuit is plugged into a USB port, the P-FET will be off (not conducting) and no significant current can flow, because Vgs will be equal to zero (because of the property of the capacitor C connected between the source and the gate). At time zero of connection, the charge on the capacitor C is zero, and C starts charging through the resistor R that is connected to the ground (and to the gate of the P FET), thus the gate voltage starts to drop from the initial 5V down to zero, thus turning the P FET on when it reaches its threshold voltage Vgs(th), and causing the P FET to start conducting current gradually. The speed of turning on the P FET would be controlled (adjusted) by changing the values of the capacitor and the resistor.

Referring again to FIG. 1, the portable USB dongle may include a male USB connector 108 and the internal supply voltage 114 may be provided to internal circuitry such as demodulator 106, tuner or any other suitable internal circuitry as desired.

Figure 3:
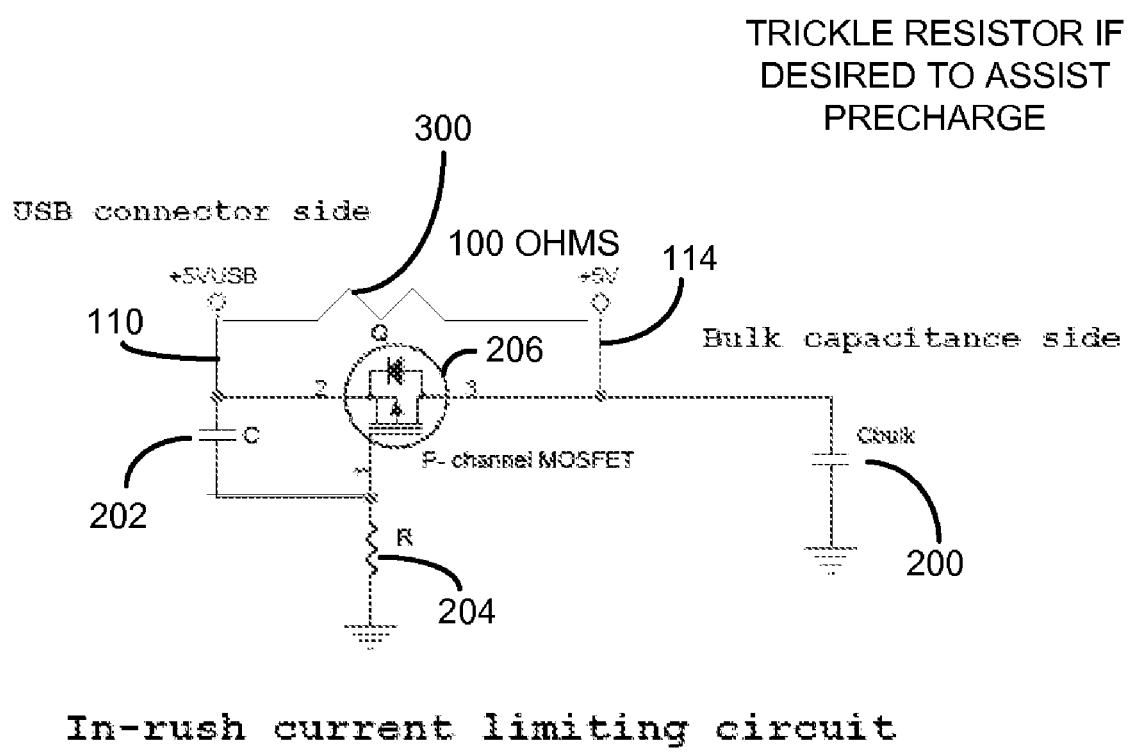
FIG. 3 is a circuit diagram illustrating another example of an in-rush current limiting circuit that employs a trickle resistor.

FIG. 3 illustrates another example of an in-rush current limiting circuit that employs a trickle resistor in accordance with another embodiment. The trickle resistor is shown as resistor 300.

Figure 4:
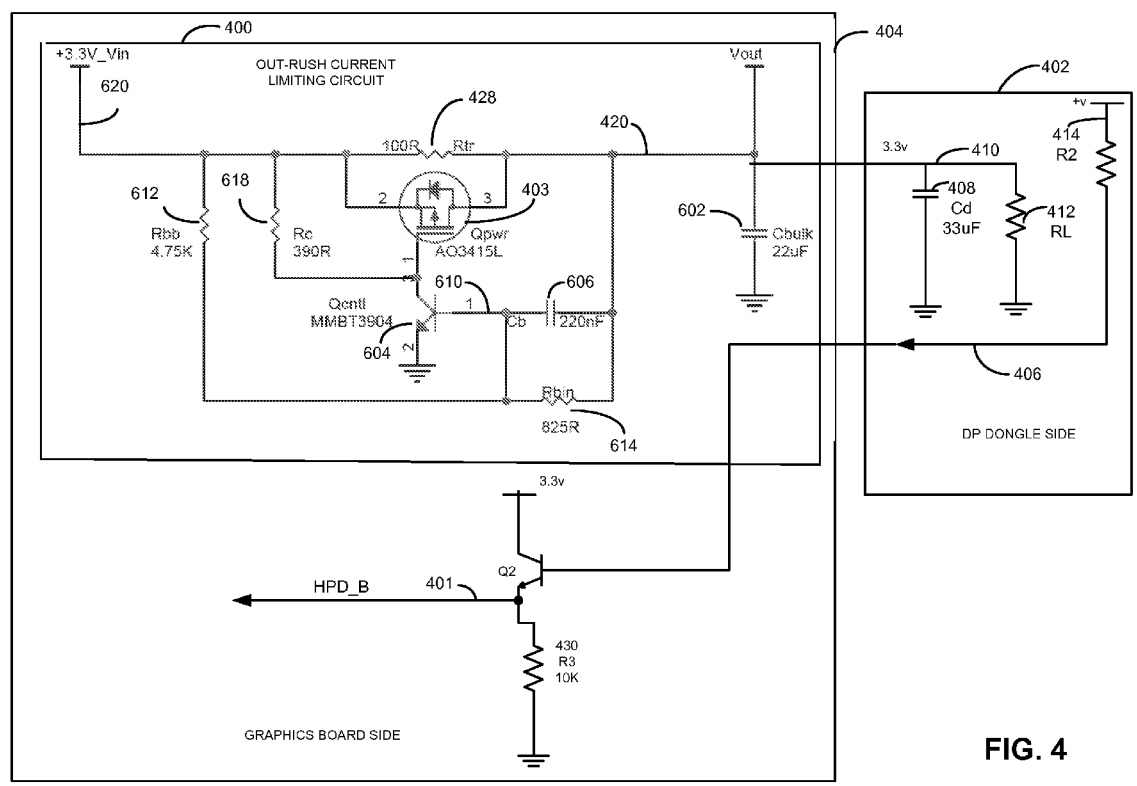
FIG. 4 is a circuit diagram illustrating one example of an out-rush current limiting circuit included in an integrated circuit, such as a graphics processor that may be coupled to a dongle.

FIG. 4 illustrates one example of a variation of the circuit of FIG. 2 that is an out-rush current limiting circuit employed on a graphics board or inside an integrated circuit which is then connected to a DP dongle. The dongle then need not employ an in-rush current limiting circuit. The HDP_B node is for hot plug detect as known in the art. The separate hot plug transistor Q2 may be a portion of an already existing circuit within the graphics board and works as known in the art to indicate a hot plug condition. In this example, the DP dongle does not include an in-rush current limiting circuit. Instead, the source device, in this example an integrated circuit (such as an integrated circuit having a graphics processor) on a graphics board, instead employs out-rush current limiting circuit 400 which limits the amount of current provided to the DP dongle during a hot plug condition, in this example. The DP dongle as shown as dongle 402, receives a supply voltage in this example shown as 3.3 volts from the source device 404 and uses the 3.3 V to provide a +V source voltage to provide a hot plug indication signal 406 to the source device 404 as known in the art. The dongle 402 may include a capacitor 408 (effective plug in capacitance from circuits in dongle) coupled to the supply voltage from the out-rush current limiting circuit 400 shown as node 410, as well as load resistance of the internal circuitry generalized as resistor 412. Resistor 414 limits the current provided by the dongle for the hot plug detect signal 406 being passed back to the source device 404.

In this example, an internal 3.3V_DP_source power supply level is used and the circuit 400 may be employed in devices that connect with Display Port connectors or any suitable connectors. In this example, the application is a low cost electronic design in which a common power source (voltage regulator) can be shared between two or more, externally hot-pluggable devices (dongles) such as Display Port power on graphics cards, or other devices, with two or more DP connectors. The purpose of this circuit is to minimize the power supply voltage dip (on an already plugged and running dongle) when another dongle is hot-plugged to another DP connector on the same graphics card. The power supply voltage dip (if not minimized) can have an adverse functional effect on the running device.

Out-rush current limiting operation—hot plugging a load with capacitance (the load is DisplayPort Dongle) to Vout will cause a momentary voltage level dip on the output bulk capacitance Cbulk 602 (caused by its fast discharge), this dip (or negative pulse) will propagate to the base of Qcntl 604 (thru the Cb 606), where it will be amplified and inverted, causing the collector level to go high, thus turning off the PFET Qpwr 403 during the dipping time. Turning Qpwr 403 off will block the main path for out-rush spike current coming from the +3.3_Vin regulator (The +3.3_Vin regulator is not shown in the schematics), thus removing the need for the regulator to enter OCP mode (Over Current Protection), otherwise, and if the regulator does enter OCP due to spike current, it will cut off its output during the spike, including the power for other possibly running dongles (not shown in the schematics).

While PFET Qpwr 403 is off, the trickle resistor Rtr 428 will charge the capacitive load (the DP dongle). The value of Rtr is to be picked based on reliability and safety considerations, assuming the possibility of permanent short circuit at the output (worst case scenario required to meet UL standard) (for this 3.3V output example, a 100 Ohm, 0805 resistor, ⅛ W is recommended). If there is a need to accelerate the charging time, then the Rtr value can be decreased (while its power rating needs to be increased—to handle the short circuit scenario safely). It will be recognized that any suitable component values may be used as desired.

The circuit 400 also provides fast short circuit protection. For example, if the output Vout 420 is shorted to ground, that will cause the voltage level at the base 610 of Qcntl 604 to become 0.49V (for Vin=3.3V and the resistors' shown in this example)—that is below the needed level to turn Qcntl on (because Rbb 612 and Rbin 614 will form a voltage divider, with Rbin 614 other side shorted direct to ground), and if Q 604 is turned off, then the level at its collector will become high, thus the PFET Qpwr 403 will be turned off (not conducting), and the only current path that will remain will be only thru the trickle resistor Rtr, with max short circuit output current=Vin/Rtr (33 mA in this example). The measured response time to short circuit an actual circuit on a modified board (with Qcntl=MMBT3904, Qpwr=AO3415AL, Rc=0.39K, Cb=220 nf, Rbb=4.75K, Rbin=0.825K) was around 10 uS.

As shown, the PMOS transistor 403 has a trickle resistor 428 coupled across its source and drain. Its gate is coupled to a collector of transistor 604 as well as to a resistor 618 which also has a node coupled to the internal supply voltage shown as 620. The transistor 604 in this example is shown as a bipolar transistor having a base operatively coupled to the gate of the PMOS transistor through capacitor 606 and to the output supply voltage 420. The voltage divider formed by resistor 612 and 614 is coupled across the source and drain of the PMOS transistor 403.

Figure 5:
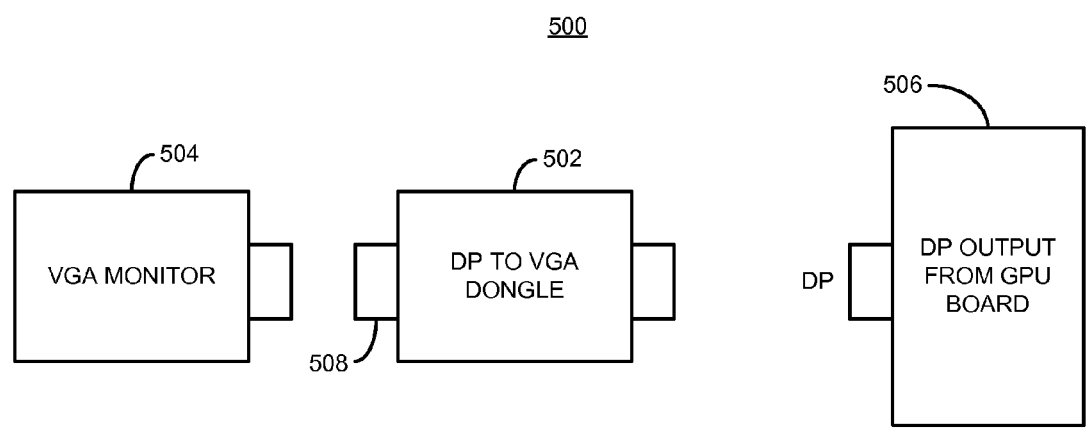
FIG. 5 is a block diagram illustrating generally a dongle that may be utilized to connect to different display panels such as a VGA to display port type panel.

FIG. 5 illustrates a video system 500 that employs a display dongle also referred to in this example as a DP to VGA dongle 502 that facilitates displaying of video on a display 504. In this example the DP to VGA dongle 502 connects to a DP display provider 506 that outputs DP display information, for example, such as a graphics processor board, or any other suitable source device to a VGA monitor 504. The DP to VGA dongle 502 may also include another connector 508 to connect, for example, to the VGA type monitor 504 through a different connector 508 so that the DP display provider 506 can output to a VGA display monitor 504 having a different information format. The circuit of FIGS. 2 and 3, for example, may be employed in the DP dongle 502. In this example, the DP dongle 502 is shown to have a plurality of connectors to facilitate connection between a display provider having a DP format, for example, and a VGA monitor 504. The application of the out-rush current limiting circuit 400 is inside the graphic card 506 for example. Another example of a dongle is a DP to DVI dongle which takes DP format information and converts it to DVI format to be connected to a DVI monitor. Even other examples will be recognized by those of ordinary skill in the art.

Also, integrated circuit design systems (e.g., work stations) are known that create integrated circuits based on executable instructions stored on a computer readable memory such as but not limited to CDROM, RAM, other forms of ROM, hard drives, distributed memory etc. The instructions may be represented by any suitable language such as but not limited to hardware descriptor language or other suitable language. As such, the logic (e.g., circuits) described herein may also be produced as integrated circuits by such systems. For example an integrated circuit may be created using instructions stored on a computer readable medium that when executed cause the integrated circuit design system to create an integrated circuit represented in FIGS. 2, 3 and 4.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. An out-rush current limiting circuit comprising:
   a PMOS transistor having a gate, source and drain, the source operative to receive an internal supply voltage, the drain operative to provide an external supply voltage based on the internal supply voltage;
   a transistor having an input operatively coupled to the drain of the PMOS transistor and an output of the transistor operatively coupled to the gate of the PMOS transistor;
   a trickle resistor operatively coupled across the source and drain of the PMOS transistor; and
   a voltage divider operatively coupled across the PMOS transistor.

2. The out-rush current limiting circuit of claim 1 wherein the input of the transistor is a base of a bipolar transistor and the base is operatively coupled to the voltage divider.

3. A portable connector comprising:
   a connector;
   a PMOS transistor, operatively coupled to the connector, having a gate source and drain, the source operative to receive an internal supply voltage, the drain operative to provide an external supply voltage based on the internal supply voltage;
   a transistor having an input operatively coupled to the drain of the PMOS transistor and an output operatively coupled to the gate of the PMOS transistor;
   a trickle resistor operatively coupled across the source and drain of the PMOS transistor; and
   a voltage divider operatively coupled across the PMOS transistor.

4. The portable connector of claim 3 wherein the input of the transistor is a base of a bipolar transistor and the base is operatively coupled to the voltage divider.

5. An apparatus comprising:
   a hot plug transistor operatively responsive to a hot plug signal from a remote connector; and
   an out-rush current limiting circuit operative to limit out rush current during a hot plug condition, the circuit comprising:
      a PMOS transistor having a gate, source and drain, the source operative to receive an internal supply voltage, the drain operative to provide an external supply voltage based on the internal supply voltage;
      a transistor having an input operatively coupled to the drain of the PMOS transistor and an output of the transistor operatively coupled to the gate of the PMOS transistor;
      a trickle resistor operatively coupled across the source and drain of the PMOS transistor; and
      a voltage divider operatively coupled across the PMOS transistor.

6. A computer readable medium comprising:
   executable instructions stored therein that when executed by an integrated circuit design system cause the integrated circuit design system to design an integrated circuit comprising:
   an out-rush current limiting circuit comprising:
      a PMOS transistor having a gate, source and drain, the source operative to receive an internal supply voltage, the drain operative to provide an external supply voltage based on the internal supply voltage;
      a transistor having an input operatively coupled to the drain of the PMOS transistor and an output of the transistor operatively coupled to the gate of the PMOS transistor;
      a trickle resistor operatively coupled across the source and drain of the PMOS transistor; and
      a voltage divider operatively coupled across the PMOS transistor.

* * * * *